(12) United States Patent
Kim et al.

(10) Patent No.: US 9,894,115 B2
(45) Date of Patent: Feb. 13, 2018

(54) COLLABORATIVE DATA EDITING AND PROCESSING SYSTEM

(71) Applicant: Samsung Electronics Co., Ltd., Gyeonggi-do (KR)

(72) Inventors: Pilwon Kim, Seoul (KR); Soyoung Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 181 days.

(21) Appl. No.: 13/970,751

(22) Filed: Aug. 20, 2013

(65) Prior Publication Data

US 2014/0053086 A1 Feb. 20, 2014

(30) Foreign Application Priority Data

Aug. 20, 2012 (KR) .......................... 10-2012-0090498

(51) Int. Cl.
*H04L 29/08* (2006.01)
*H04L 29/06* (2006.01)
(Continued)

(52) U.S. Cl.
CPC ............ *H04L 65/403* (2013.01); *G06F 3/002* (2013.01); *G06F 3/0488* (2013.01); *G11B 27/034* (2013.01); *H04L 65/4015* (2013.01); *H04L 65/4023* (2013.01); *H04N 1/00244* (2013.01); *H04N 1/00307* (2013.01); *H04N 1/00347* (2013.01); *H04N 1/00411* (2013.01);
(Continued)

(58) Field of Classification Search
CPC ....................... H04L 65/403; H04N 2201/3246

USPC .......................................................... 715/753
See application file for complete search history.

(56) References Cited

U.S. PATENT DOCUMENTS 5,394,521 A * 2/1995 Henderson, Jr. ...... G06F 3/0481
715/788
7,301,536 B2 * 11/2007 Ellenby .................. G01C 17/34
345/419
(Continued)

FOREIGN PATENT DOCUMENTS

CN 1694527 A 11/2005
CN 101647009 A 2/2010
(Continued)

OTHER PUBLICATIONS

Chinese Search Report dated Mar. 20, 2017.

*Primary Examiner* — Nicholas Klicos
(74) *Attorney, Agent, or Firm* — Cha & Reiter, LLC.

(57) ABSTRACT

A system uses portable processing devices that communicate with external devices. A portable processing device having a camera transmits, to a server, an identification information request message including an image acquired by the camera; receives, from the server, identification information related to an object shown in the image; in response to user selection of the object, transmits, to the server, a data request message requesting data corresponding to the identification information of the selected object; receives, from the server, a first data corresponding to the identification information; edits the first data to provide a second data in response to user input information; and transmits the second data to the server enabling the server to update the first data to provide the second data item.

5 Claims, 11 Drawing Sheets

(51) Int. Cl.
*G11B 27/034* (2006.01)
*H04N 1/00* (2006.01)
*H04N 1/32* (2006.01)
*G06F 3/0488* (2013.01)
*G06F 3/00* (2006.01)
*H04N 101/00* (2006.01)

(52) U.S. Cl.
CPC ..... *H04N 1/32106* (2013.01); *H04N 2101/00* (2013.01); *H04N 2201/001* (2013.01); *H04N 2201/0084* (2013.01); *H04N 2201/0089* (2013.01); *H04N 2201/3242* (2013.01); *H04N 2201/3245* (2013.01); *H04N 2201/3246* (2013.01); *H04N 2201/3249* (2013.01); *H04N 2201/3278* (2013.01)

(56) References Cited

U.S. PATENT DOCUMENTS

| | | | |
|---|---|---|---|
| 7,908,325 B1* | 3/2011 | Pabla | G06F 9/542 709/205 |
| 7,991,220 B2 | 8/2011 | Nagai | A63F 3/00643 345/633 |
| 8,884,984 B2* | 11/2014 | Flaks | G02B 27/017 345/419 |
| 8,943,582 B1* | 1/2015 | Zhou | G06F 13/00 726/19 |
| 9,086,837 B1* | 7/2015 | Kang | G06F 3/016 |
| 9,122,053 B2* | 9/2015 | Geisner | G02B 27/017 |
| 9,275,148 B1* | 3/2016 | Elassaad | G06F 17/30864 |
| 2004/0088646 A1 | 5/2004 | Yeager et al. | |
| 2004/0174346 A1 | 9/2004 | Shenholz et al. | |
| 2005/0262201 A1 | 11/2005 | Rudolph et al. | |
| 2006/0294247 A1* | 12/2006 | Hinckley | G06F 3/038 709/228 |
| 2007/0273644 A1* | 11/2007 | Mondine Natucci | G06T 19/006 345/156 |
| 2008/0226119 A1* | 9/2008 | Candelore et al. | 382/100 |
| 2008/0235654 A1 | 9/2008 | Marius | |
| 2009/0102859 A1* | 4/2009 | Athsani et al. | 345/619 |
| 2009/0128564 A1* | 5/2009 | Okuno | G06T 15/20 345/427 |
| 2009/0207322 A1* | 8/2009 | Mizuuchi | G03B 21/14 348/745 |
| 2010/0030578 A1* | 2/2010 | Siddique et al. | 705/3 |
| 2010/0036860 A1* | 2/2010 | Hiura et al. | 707/101 |
| 2010/0156836 A1* | 6/2010 | Katayama | G01S 5/16 345/173 |
| 2010/0199232 A1* | 8/2010 | Mistry | G06F 1/163 715/863 |
| 2010/0208033 A1* | 8/2010 | Edge | G06F 3/012 348/46 |
| 2010/0270091 A1 | 10/2010 | Ding et al. | |
| 2010/0271906 A1 | 10/2010 | Ding et al. | |
| 2010/0287485 A1* | 11/2010 | Bertolami et al. | 715/764 |
| 2010/0325563 A1* | 12/2010 | Goldthwaite | G06F 3/04815 715/757 |
| 2011/0026898 A1 | 2/2011 | Lussier et al. | |
| 2011/0138317 A1* | 6/2011 | Kang et al. | 715/780 |
| 2011/0140994 A1* | 6/2011 | Noma | G02B 27/017 345/8 |
| 2011/0154192 A1 | 6/2011 | Yang et al. | |
| 2011/0228175 A1* | 9/2011 | Nicoli | G06F 1/1626 348/745 |
| 2011/0242134 A1* | 10/2011 | Miller | G06T 19/006 345/633 |
| 2011/0242361 A1* | 10/2011 | Kuwahara | A63F 13/10 348/231.4 |
| 2011/0249024 A1* | 10/2011 | Arrasvuori et al. | 345/629 |
| 2011/0310260 A1* | 12/2011 | Jordan | G06F 3/011 348/207.1 |
| 2012/0008003 A1* | 1/2012 | Lim et al. | 348/222.1 |
| 2012/0030566 A1* | 2/2012 | Victor | G06F 3/0482 715/702 |
| 2012/0069131 A1* | 3/2012 | Abelow | 348/14.01 |
| 2012/0079426 A1* | 3/2012 | Jin | A63F 13/06 715/810 |
| 2012/0086729 A1* | 4/2012 | Baseley | G06F 3/011 345/633 |
| 2012/0092329 A1 | 4/2012 | Koo et al. | |
| 2012/0105703 A1* | 5/2012 | Lee et al. | 348/333.11 |
| 2012/0114249 A1 | 5/2012 | Conwell | |
| 2012/0179672 A1 | 7/2012 | Van Wie et al. | |
| 2012/0194418 A1* | 8/2012 | Osterhout | G02B 27/0093 345/156 |
| 2012/0194541 A1* | 8/2012 | Kim et al. | 345/619 |
| 2012/0249741 A1* | 10/2012 | Maciocci et al. | 348/46 |
| 2012/0299962 A1* | 11/2012 | White | G02B 27/017 345/633 |
| 2013/0019189 A1* | 1/2013 | Stewart et al. | 715/760 |
| 2013/0057581 A1* | 3/2013 | Meier | 345/633 |
| 2013/0178257 A1* | 7/2013 | Langseth | 463/4 |
| 2013/0243324 A1* | 9/2013 | King et al. | 382/176 |
| 2013/0293468 A1* | 11/2013 | Perez et al. | 345/158 |
| 2014/0129645 A1 | 5/2014 | Mo | |
| 2014/0285519 A1* | 9/2014 | Uusitalo | G06T 11/00 345/633 |
| 2015/0040074 A1* | 2/2015 | Hofmann et al. | 715/852 |

FOREIGN PATENT DOCUMENTS

| | | |
|---|---|---|
| CN | 102084354 A | 6/2011 |
| CN | 102262620 A | 11/2011 |
| CN | 102292713 A | 12/2011 |
| CN | 102460413 A | 5/2012 |
| CN | 102520922 A | 6/2012 |
| EP | 2 450 899 A1 | 5/2012 |
| WO | 2013/086739 A1 | 6/2013 |

* cited by examiner

FIG. 6
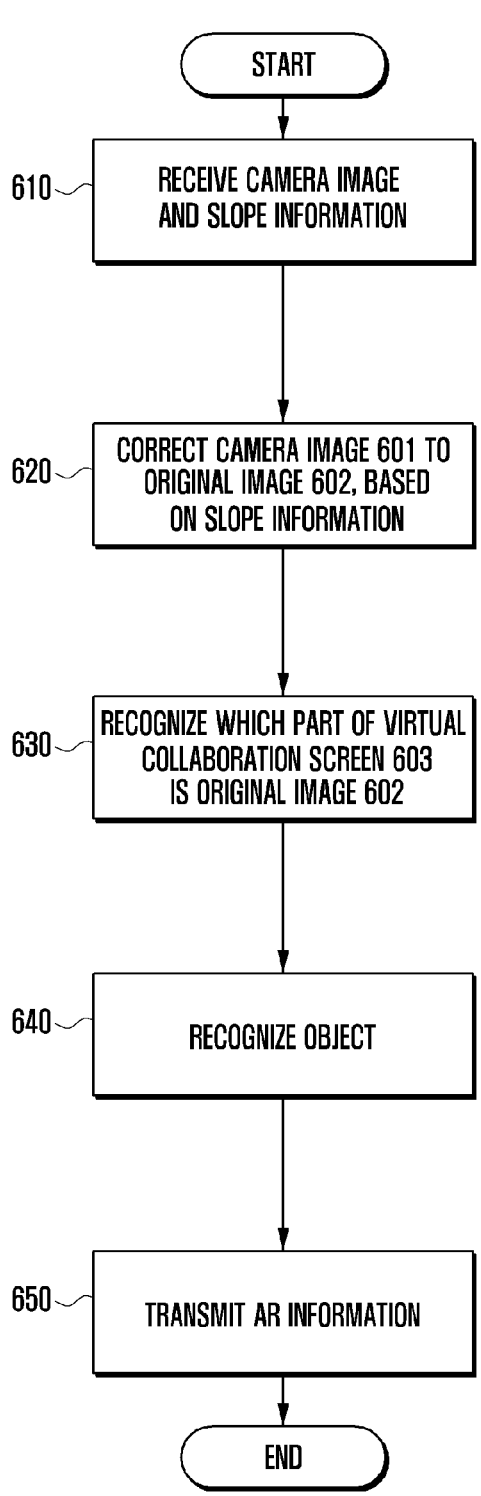
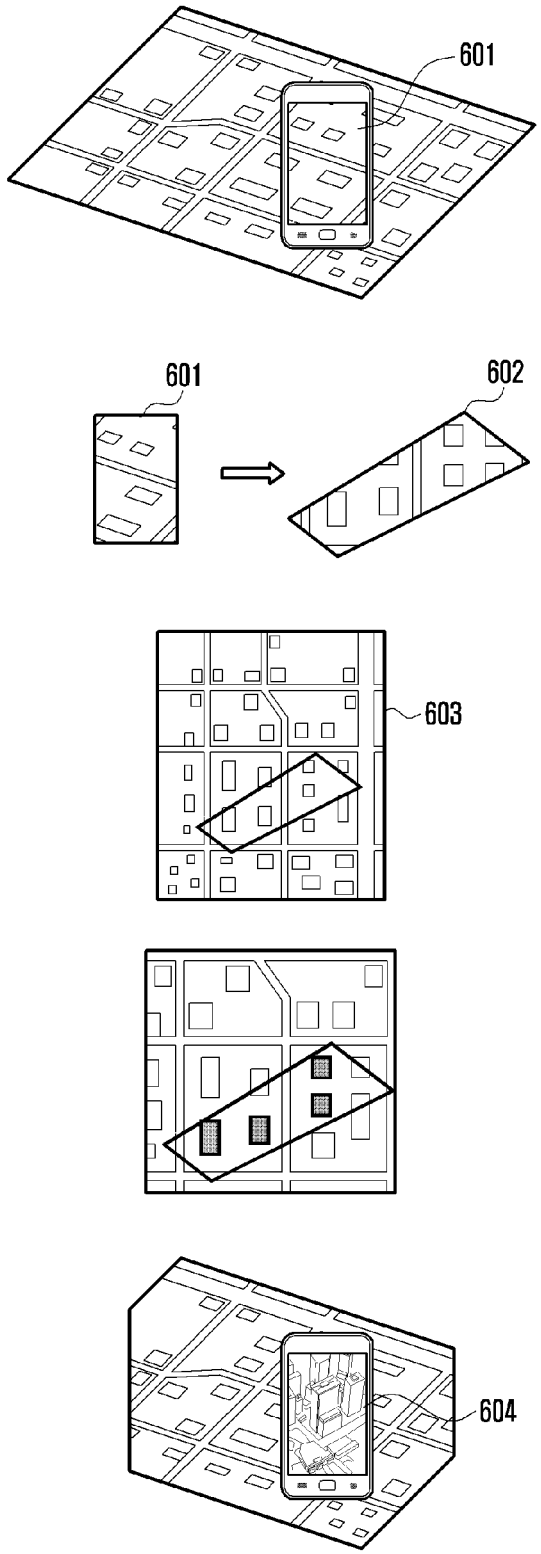

COLLABORATIVE DATA EDITING AND PROCESSING SYSTEM

CROSS RELATED REFERENCE

This application claims the benefit under 35 U.S.C. § 119(a) of a Korean patent application filed on Aug. 20, 2012 in the Korean Intellectual Property Office and assigned Serial No. 10-2012-0090498, the entire disclosure of which is hereby incorporated by reference.

BACKGROUND

Field of the Invention

The present disclosure relates to a collaborative image window content and document editing method implementable by mobile processing devices communicating with external devices.

Description of the Related Art

Collaborative electronic bulletin board systems (e.g., the eBeam system of Luidia Inc.) are known. A known electronic bulletin board system may be composed of a projector for projecting images onto a screen (e.g., a white wall or a whiteboard.), an electronic pen, a sensor for detecting a beam (e.g., ultrasonic waves or infrared light) emitted from the electronic pen, and a computer for recognizing a trace (i.e., written information) of the electronic pen from information received by the sensor, controlling the projector to display the trace on the screen, and storing the written information. A user is able to write on an image by touching the electronic pen to the screen instead of using a real pen.

A known virtual collaboration space is a virtual environment that allows collaborative participants to work together in a single work space by using computers interconnected via a network. A known virtual collaboration space physically comprises a storage space and may be constructed at location of a participant computer or at a separate server. Through a known virtual collaboration space, a computer may share a screen, e.g., a PowerPoint screen, with other computers and make a single document, e.g., a PowerPoint file, by working together with other computers. A Meeting Space in Microsoft Windows is a known typical example.

In a known virtual collaboration space, collaborative participants work together using respective individual computers. A collaboration service using a common screen such as the screen of an electronic bulletin board system is not available in computers that provide a typical virtual collaboration space. Additionally, an electronic bulletin board system requires an electronic pen and a sensor for detecting a beam from an electronic pen such that a participant can directly manipulate data in a virtual collaboration space through the screen. However, in most cases, collaborative participants do not have their own electronic pens. Participants usually work in turn, moving toward the screen one by one and using a single electronic pen. Unfortunately, this causes lower work efficiency. A system according to invention principles addresses these deficiencies and related problems.

SUMMARY

A system addresses the above-mentioned problems and/or disadvantages and offers at least the advantages described below.

A collaborative system enables collaborative participants to work together through a common screen by using their own portable processing devices without additional tools such as an electronic pen and a sensor.

A collaborative method is implementable by a portable processing device having a camera. The method includes the activities of transmitting, to a server, an identification information request message including an image acquired by the camera; receiving, from the server, identification information related to an object shown in the image; in response to user selection of the object in the image, transmitting, to the server, a data request message requesting data corresponding to the identification information of the selected object; receiving, from the server, a first data corresponding to the identification information; in response to user input information, editing the first data to provide a second data item; and transmitting the second data to the server enabling the server to update the first data to provide the second data item.

According to another aspect of the invention, a collaborative method implementable by a server or other computer enables wireless communication with a client and displays a collaboration window on an external display device or an internal display unit. The method includes the activities of receiving, from the client, an identification information request message including an image acquired by a camera; recognizing which part of the collaboration window corresponds to the image; in response to a determination an object is shown in the recognized part, transmitting identification information related to the object to the client; receiving, from the client, a data request message requesting data corresponding to the identification information; transmitting, to the client, a first data corresponding to the identification information in response to the data request message; receiving a second data from the client; and updating the first data to provide the second data item.

According to another aspect of the invention, a portable processing device includes a camera; a wireless communication unit configured to perform wireless communication with a server; a display unit having a touch screen and configured to display an image acquired by the camera and to display data received from the server through the wireless communication unit; and a control unit configured to control the camera, the wireless communication unit and the display unit, wherein the control unit is configured to, control the wireless communication unit to transmit to the server an identification information request message including the image, receive identification information related to an object contained in the image from the server through the wireless communication unit, in response to user selection of the object, control the wireless communication unit to transmit to the server a data request message requesting data corresponding to the identification information of the selected object, receive a first data corresponding to the identification information received from the server through the wireless communication unit, in response to user input information received from the touch screen, edit the first data to provide a second data, and control the wireless communication unit to transmit the second data to the server.

According to yet another aspect of the invention, a portable processing device includes a wireless communication unit configured to perform wireless communication with a client and an external display device; a memory unit configured to store a collaboration window and related data; and a control unit configured to control the wireless communication unit and the memory unit, wherein the control unit is configured to, control the external display device to display the virtual collaboration window through the wireless communication unit, receive an identification information request message including an image acquired by a camera from the client through the wireless communication unit, recognize which part of the collaboration window corresponds to the image, in response to determination an object is contained in the recognized part, transmit identification information related to the object to the client, receive a data request message requesting data corresponding to the identification information from the client through the wireless communication unit, read a first data corresponding to the identification information from the memory unit, control the wireless communication unit to transmit the first data to the client, receive a second data from the client through the wireless communication unit, and control the memory unit to update the first data to provide the second data item.

Other aspects, advantages, and salient features of the invention will be apparent to those skilled in the art from the following detailed description, which, taken in conjunction with the annexed drawings, discloses exemplary embodiments of the invention.

BRIEF DESCRIPTION OF THE DRAWINGS

FIG. 6 is a flow diagram illustrating a method for correcting an image acquired by a camera in accordance with an embodiment of the present invention.

DETAILED DESCRIPTION

Figure 1:
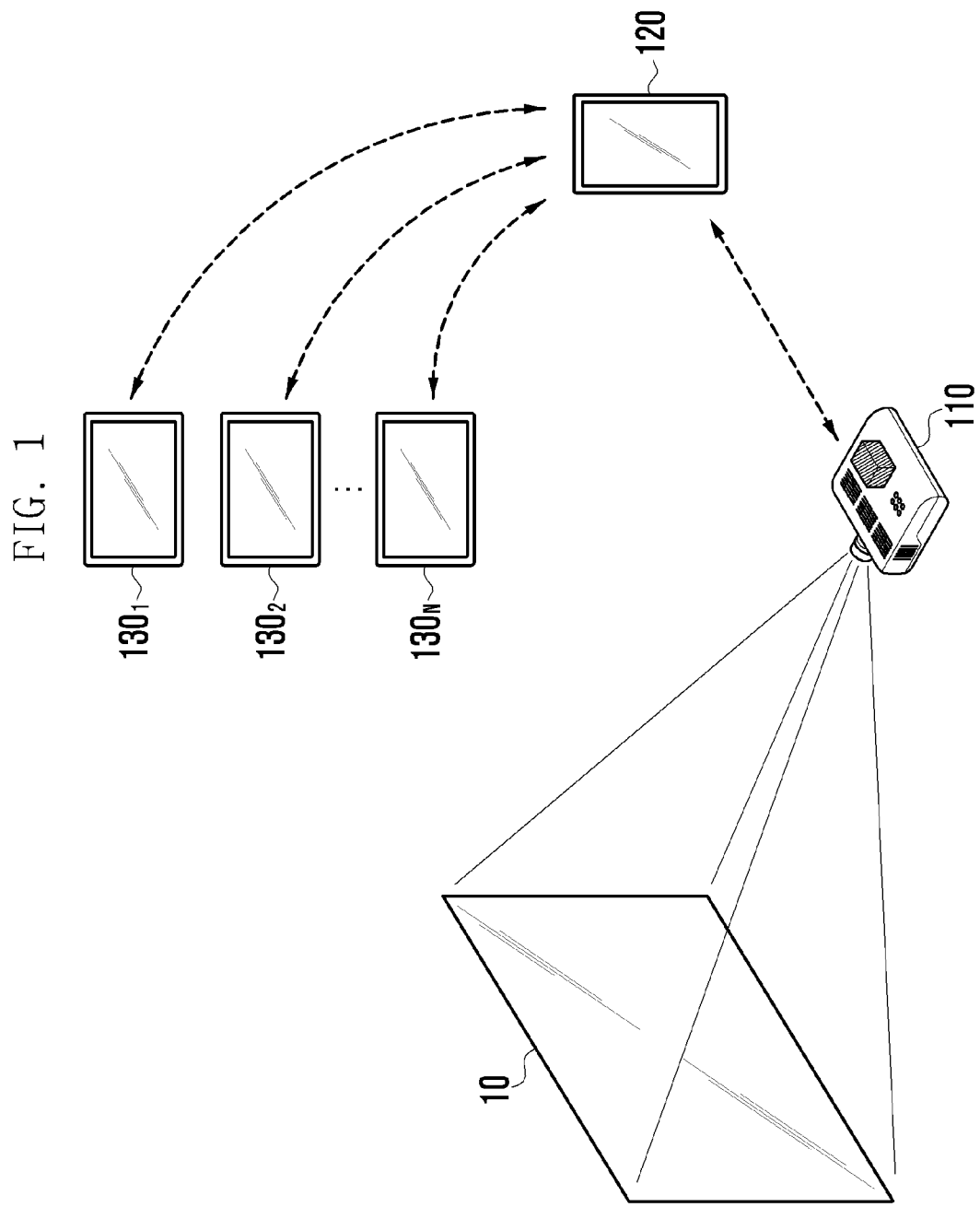
FIG. 1 is a schematic diagram illustrating a collaborative system in accordance with an embodiment of the present invention.

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

A collaboration method and apparatus of this invention are realized in a client and a server.

In this disclosure, a client is an apparatus that offers, to a user, a function to work together with other clients through a virtual collaboration space. A client is portable, allows a communication with any external entity (e.g., a server), and has a camera and a display unit. For example, a smart phone, a tablet PC, or the like may be used as a client.

In this disclosure, a server is an apparatus that allows a communication with any external entity (e.g., a client) and offers a virtual collaboration space to clients. For example, a desktop PC, a smart phone, a tablet PC, a notebook PC, or the like may be used as a server. A client may download data from a virtual collaboration space through access to a server, work with the downloaded data, and upload the working data to the virtual collaboration space. One of clients may perform a function of a server, using Wi-Fi direct or Ad-hoc technology which is well known as technology to allow a direct communication between portable processing devices.

In this disclosure, a virtual collaboration window refers to a screen that shows data uploaded in a virtual collaboration space. A virtual collaboration window may be displayed on any external display device separately from a server. For example, a virtual collaboration window may be projected onto any physical screen from a projector or displayed on a smart TV, a 3-dimensional TV, or any other equivalent. Alternatively, a virtual collaboration window may be displayed on a display unit of a server.

In this disclosure, an object refers to what arranged and shown in a virtual collaboration window. An object itself may be a target of work. Also, an object may be used as a medium of link to data which is a target of work. For example, if data is a video file, an object may be a thumbnail or an icon which represents a video. A memo pad may be an object per se and a target of work. The terms "mobile" and "portable" are used interchangeably as meaning transportable by a user, for example.

In this disclosure, identification information refers to information that allows a user to distinguish an object from the others. Identification information may be displayed on a corresponding object. For example, in a road view, an object is a building, and identification information is additional information, e.g., augmented reality information, associated with a building.

FIG. 1 is a schematic diagram illustrating a collaborative system in accordance with an embodiment of the present invention.

Referring to FIG. 1, the collaborative system in an embodiment of this invention includes a projector 110, a server 120, and a plurality of clients $130_1$ to $130_N$.

The projector 110 receives an image, i.e., a virtual collaboration window, from the server 120 and projects the received virtual collaboration window onto a screen 10. The projector 110 may have a wireless communication unit such as a Wi-Fi module and a Bluetooth module so as to perform a wireless communication with the server 120 and/or an external interface unit for a wired communication with the server 120.

The server 120 may store a virtual collaboration space and a virtual collaboration window. In some embodiments, a virtual collaboration space and a virtual collaboration window may be stored in any other apparatus which is physically separate from the server 120. In this case, the server 120 may remotely manage a virtual collaboration space and a virtual collaboration window through a network. The server 120 controls the projector 110 to display a virtual collaboration window on the screen 10. Additionally, the server 120 manages the editorial rights for a virtual collaboration space. Server 120 provides at least one of the clients 130$_1$ to 130$_N$ with the editorial rights. The client having the editorial rights can edit data in a virtual collaboration space through the server 120. Editing as used herein, may include deleting existing data, modifying existing data (e.g., modifying the content of data or modifying a path such as moving from one folder to other folder), adding new data, or the like. Based on an edit of data, the server 120 updates a virtual collaboration space and a virtual collaboration window. The client having no editorial rights cannot edit data and acts only as a viewer.

The client (e.g., 130$_1$) captures a virtual collaboration window by executing a camera-based application and transmits, to the server 120, an identification information request message containing an image acquired by a camera. Server 120 receives the identification information request message from the client (e.g., 130$_1$) and recognizes which part of a virtual collaboration window is the image. Additionally, the server 120 determines whether the recognized part includes at least one object. If an object is included, the server 120 transmits, to the client (e.g., 130$_1$), a response message containing identification information (e.g., augmented reality (AR) information) for identifying the object. The client (e.g., 130$_1$) may display the identification information on a corresponding object. If an object itself has a specific image (e.g., a thumbnail or icon) distinguished from the others, the identification information may not be displayed. In response to this identification information or a corresponding object being selected by a user (e.g., touched on the display unit 210), the client (e.g., 130$_1$) transmits to the server 120 a data request message containing identification information about the selected object. Server 120 transmits to the client (e.g., 130$_1$) a response message containing data corresponding to identification information about the selected object. This response message may further have the editorial rights. As discussed above, the clients 130$_1$ to 130$_N$ access a virtual collaboration space by executing a camera-based application. Namely, a virtual collaboration window is a medium linking a client and a virtual collaboration space such that the client can access the virtual collaboration space.

The clients 130$_1$ to 130$_N$ display data (e.g., image, text, audio, video, 3D map information, for example) received from the server 120. In response to having editorial rights, the clients 130$_1$ to 130$_N$ can edit data and transmit an update request message containing edited data to the server 120. Based on the update request message, the server 120 updates the virtual collaboration space and the virtual collaboration window.

Figure 2:
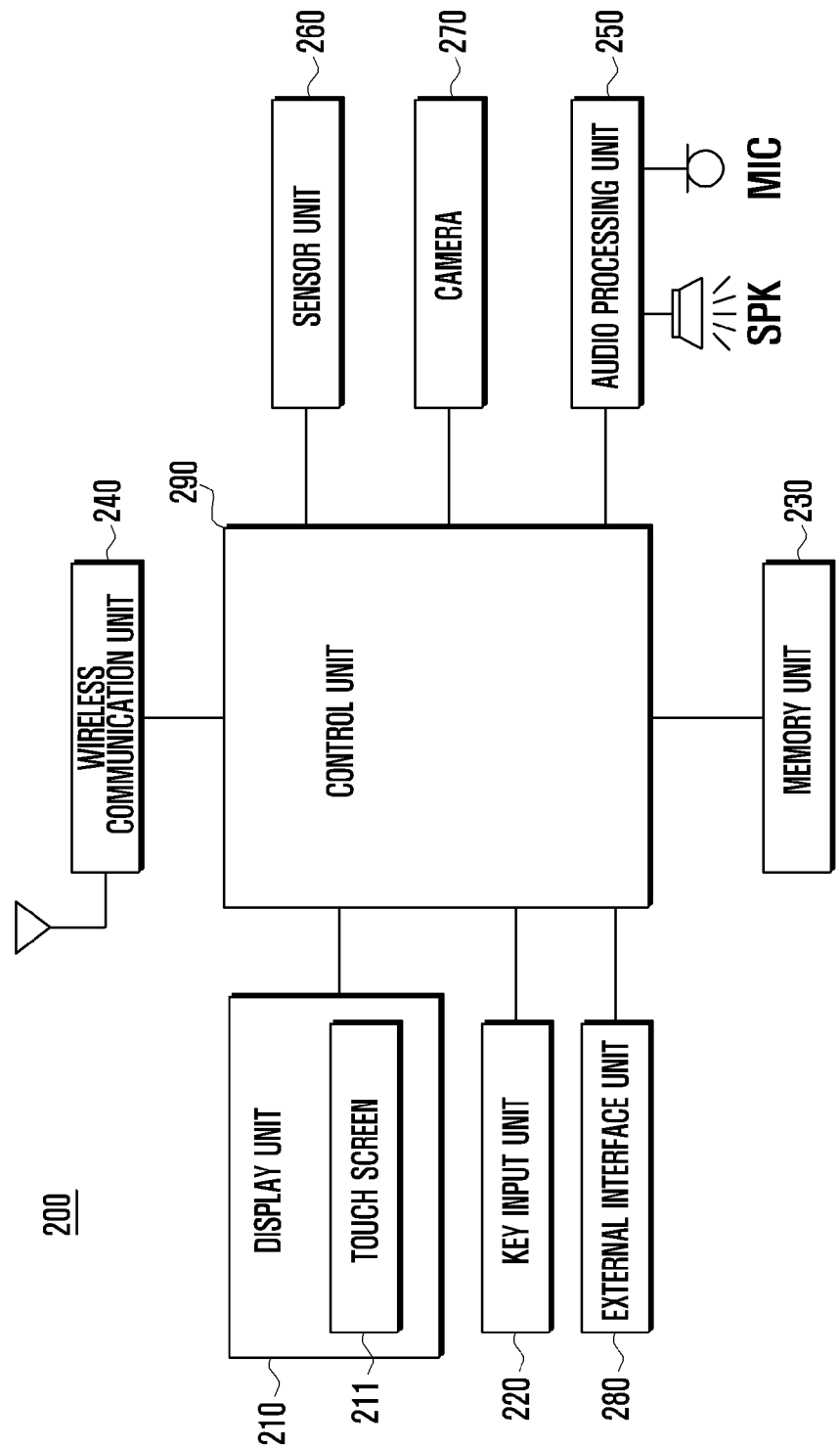
FIG. 2 is a block diagram illustrating a portable processing device in accordance with an embodiment of the present invention.

FIG. 2 is a block diagram illustrating a portable processing device in accordance with an embodiment of the present invention. The portable processing device shown in FIG. 2 may operate as a client or a server.

Referring to FIG. 2, the portable processing device 200 in an embodiment of this invention includes a display unit 210, a key input unit 220, a memory unit 230, a wireless communication unit 240, an audio processing unit 250, a sensor unit 260, a camera 270, an external interface unit 280, and a control unit 290.

The display unit 210 converts image data received from the control unit 290 into analog signals and then displays the converted data thereon under the control of the control unit 290. Display unit 210 displays a variety of screens in connection with the use of the portable processing device 200, e.g., a lock screen, a home screen, an application execution screen, a virtual keypad, a camera image, and the like. The display unit 210 may be formed of liquid crystal display (LCD), an organic light emitted diode (OLED), an active matrix OLED (AMOLED), or any other equivalent.

In order to provide a user interface for interaction with a user, the display unit 210 may include a touch screen 211 placed thereon. The touch screen 211 creates an analog signal (i.e., a touch event) in response to a touch-based user gesture, converts the analog signal into a digital signal, and transmits the converted signal to the control unit 290. Control unit 290 detects a user gesture from the received touch event. Such a user gesture is classified into a touch and a touch gesture. Additionally, a touch gesture may include a tap, a drag, a flick, and the like. A touch refers to a contact state on the touch screen, and a touch gesture refers to a touch movement from touch-on to touch-off. The touch screen 211 may be a complex touch panel that is composed of a finger touch panel for detecting a finger gesture and a pen touch panel for detecting a pen gesture. The finger touch panel may be formed of a capacitive type, a resistive type, an infrared type, or an ultrasonic type. The finger touch panel may create a touch event by user's finger gesture or any other equivalent (e.g., any conductive tool capable of causing a change in capacitance). The pen touch panel may comprise an electromagnetic induction type and the pen touch panel may create a touch event by a stylus pen which is specially manufactured to form a magnetic field.

Additionally, the display unit 210 performs a function to display 3-dimensional image (including a left-eye image and a right-eye image) under the control of the control unit 290 as if it exists in a real space. For this, the display unit 210 may have a 3D rendering module that gives a stereoscopic effect to a user. The 3D rendering module is configured to form a stack with the display unit 210 such that user's left and right eyes can perceive different images. As known in the art, such 3D rendering technology is classified into a glasses type and a glasses-free type. A glasses type includes a color filter type, a polarizing filter type, a shutter glass type, and the like. A glasses-free type includes a lenticular lens type, a parallax barrier type, and the like. Since these 3D rendering technologies are well known in the art, detailed descriptions will be omitted.

The key input unit 220 may have a plurality of keys (i.e., buttons) for entering letters or numbers and setting various functions. These keys may include a menu invoking key, a screen on/off key, a power on/off key, a volume adjusting key, and the like. The key input unit 220 creates a key event in connection with user setting or function control of the portable processing device 200 and delivers the key event to the control unit 290. Such a key event may include a power on/off event, a volume adjusting event, a screen on/off event, and the like. The control unit 290 controls the above-mentioned elements in response to the received key event. A key or button of the key input unit 220 may be referred to as a hard key, whereas a key or button displayed on the display unit 210 may be referred to as a soft key.

The memory unit 230 may act as a secondary memory unit and include a nonvolatile memory such as NAND flash memory. Also, the memory unit 230 may be composed of a program region and a data region. Under the control of the control unit 290, the memory unit 230 may store data created in the portable processing device 200 or received from external entities via the wireless communication unit 240. If the mobile processing device 200 acts as a server, a partial space of the data region is used as a virtual collaboration space, and data stored therein is shared with clients. Such data in the virtual collaboration space may be updated by a client having the editorial rights.

The memory unit 230 stores an operating system (OS) and various programs required for operation of the portable processing device 200. Particularly, the memory unit 230 stores a collaboration program that enables the portable processing device 200 to perform a function of either a client or a server.

The memory unit 230 stores a voice recognition program and a face recognition program. The voice recognition program detects voice feature information (e.g., voice tone, frequency, decibel, for example) from voice data. Also, the voice recognition program compares the detected voice feature information with pre-stored voice feature information and, based on comparison results, recognizes a user. And also, the voice recognition program may have a speech-to-text (STT) function to convert voice data into text. The face recognition program recognizes user's face from an image captured by the camera 270. Specifically, the face recognition program extracts face information from image data, compares the extracted face information with pre-stored face information, and based on the comparison results, recognizes a user. Meanwhile, instead of the above-discussed voice or face recognition program, user recognition may be performed through any other suitable program such as an iris scan program.

In order to determine user intention from voice or image data, the memory unit 230 stores an artificial intelligence program. For example, the artificial intelligence program may include a natural language processing engine that processes context recognized from voice data, a user motion recognition engine that deciphers the intention of a user motion (e.g., a movement of hands or eyes) from image data, an inference engine that infers user's intention from the recognized context, an interactive engine that interacts with a user on the basis of the recognized context or user motion, and the like.

The memory unit 230 may store embedded applications and third party applications. The embedded application refers to an application executable in the portable processing device. For example, the embedded application may be an environment setting program, a web browser, an email application, an instant messenger, a collaboration program, a voice recognition program, a face recognition program, an artificial intelligence program, and the like. The third party application refers to an application selectively downloaded from the Internet and installed in the portable processing device. A great variety of third party applications are well known in the art. The third party application can be freely installed and removed. A collaboration program, a voice recognition program, a face recognition program, and an artificial intelligence program may be the third party application. When the portable processing device 200 is turned on, at the outset a booting program is loaded into a main memory unit (e.g., RAM) of the control unit 290. The booting program loads the operating system into the main memory unit such that the portable processing device 200 can operate. The operating system loads various programs into the main memory unit and executes them. Particularly, when a connection with an external entity is detected, the operating system loads a data communication program into the main memory unit and executes it. Since such booting and loading processes are well known in the art, detailed descriptions will be omitted.

The wireless communication unit 240 performs a voice call, a video call, or a data communication under the control of the control unit 290. For this, the wireless communication unit 240 may include an RF (radio frequency) transmitter that up-converts the frequency of an outgoing signal and then amplifies the signal, an RF receiver that amplifies with low-noise an incoming signal and down-converts the frequency of the signal, and the like. Also, the wireless communication unit 240 may include a mobile communication module (e.g., a 3-generation mobile communication module, a 3.5-generation mobile communication module, a 4-generation mobile communication module, for example), a digital broadcast module (e.g., a DMB module), and/or a short-range communication module (e.g., a Wi-Fi module, a Bluetooth module, for example).

The audio processing unit 250 performs input and output functions for voice recognition, voice recording, digital recording, and a call by combining a speaker (SPK) and a microphone (MIC). The audio processing unit 250 receives audio data from the control unit 290, converts the received audio data into analog signals, and outputs the analog signals to the speaker (SPK). Additionally, the audio processing unit 250 receives analog signals from the microphone (MIC), converts the received analog signals into audio data, and offers the audio data to the control unit 290. The speaker (SPK) converts the analog signals received from the audio processing unit 250 into sound waves and outputs them. The microphone (MIC) converts sound waves collected from human or any other sound source into analog signals.

The sensor unit 260 detects a physical parameter (e.g., acceleration), converts the detected physical parameter into electric signals, performs an analog-to-digital conversion to change the electric signals to detection information, and transmits the detection information to the control unit 290. The sensor unit 260 may be formed of a single chip in which sensors are integrated, or of separate individual chips of sensors. Particularly, the sensor unit 260 may have a three-axis acceleration sensor that detects the acceleration of gravity with regard to each of X-axis, Y-axis and Z-axis. The acceleration sensor detects the sum of the acceleration of movement of the portable processing device 200 and the acceleration of gravity. If there is no movement of the portable processing device 200, the acceleration sensor detects only the acceleration of gravity. For example, if the portable processing device 200 is placed on a table (i.e., the XY plane) and the display unit 210 thereof faces upward (in a positive Z-axis direction), the acceleration of gravity detected by the acceleration sensor may have X-axis and Y-axis ingredients of 0 m/sec$^2$ and Z-axis ingredient of 9.8 m/sec$^2$. Similarly, if the display unit 210 faces downward (in a negative Z-axis direction), the acceleration of gravity may have X-axis and Y-axis ingredients of 0 m/sec$^2$ and Z-axis ingredient of −9.8 m/sec$^2$. If there is a movement of the portable processing device 200, the acceleration sensor detects the sum of the acceleration of movement of the portable processing device 200 and the acceleration of gravity. For example, if a user holds the portable processing device 200 with one hand at an angle on a table, the acceleration of gravity may have a non-zero value with regard to at least one axis. In this case, the square root of the sum of the squares of three-axis ingredients may have a specific value (e.g., 9.8 m/sec$^2$).

The camera 270 captures an image of subject and transmits a camera image to the control unit 290 under the control of the control unit 290. Specifically, the camera 270 may include a lens by which light rays converge, an image sensor (e.g., a complementary metal oxide semiconductor (COMS) image sensor or a charge couple device (CCD) image sensor) which converts light rays into electric signals, and an image signal processor (ISP) which performs an analog-to-digital conversion from the electric signals, received from the image sensor, to image data and outputs the image data to the control unit 290. The ISP of the camera 270 may have a display control module which processes image data to a preview image (e.g., resizing of resolution according to a screen size of the display unit 210) and outputs it to the control unit 290, and a coding module which encodes image data (e.g., compression with MPEG format) and outputs it to the control unit 290. The control unit 290 may control the display unit 210 to display a preview image, and also control the memory unit 230 to store encoded image data. Meanwhile, the portable processing device 200 may have a front camera disposed at the front side thereof (i.e., the side where the touch screen is disposed) and a rear camera disposed at the rear side thereof. The rear camera may be used for capturing a subject (e.g., a virtual collaboration window), and the front camera may be used for recognizing user's face or motion or for a video call.

The external interface unit 280 establishes a wired connection to any external entity (e.g., other portable processing device, a desktop PC, a notebook PC, a headphone, for example) and performs a data communication under the control of the control unit 290.

The control unit 290 controls the whole operations of the portable processing device 200, controls signal flows between internal components of the portable processing device 200, and processes data. Additionally, the control unit 290 may include a main memory unit for storing programs and the operating system, a cache memory for temporarily storing data to write in the memory unit 230 or data read from the memory unit 230, the central processing unit (CPU), and the graphic processing unit (GPU). The operating system acts as an interface between hardware and program and manages computer resources such as the CPU, the GPU, the main memory unit, the secondary memory unit, and the like. Namely, the operating system enables the portable processing device to operate, defines the order of tasks, and controls arithmetic operations of the CPU and GPU. Also, the operating system performs a function to control the execution of a program and a function to manage storing data and files. Meanwhile, as well known in the art, the CPU is a key control unit of computer system that performs calculation and comparison of data and interpretation and execution of commands. The GPU is a graphic control unit that performs, in place of the CPU, calculation and comparison of graphic-related data and interpretation and execution of related commands. Each of the CPU and the GPU may be formed of a single package into which two or more independent cores (e.g., quad-core) are integrated. Alternatively, the CPU and the GPU may be integrated into a single chip (i.e., system on chip; SoC). Alternatively, the CPU and GPU may be packaged in the form of multi-layer. A structure having the CPU and the GPU may be referred to as an application processor (AP).

The control unit 290 performs a function to recognize a user voice and convert voice data into text by executing a voice recognition program, a function to recognize a user face and motion by executing a face recognition program, and a function to recognize and process context from voice data, to decipher the intention of user motion from image data, and to infer user intention from the recognized context by executing an artificial intelligence program. Alternatively, a function related to artificial intelligence may be performed at an external server rather than the control unit 290. In this case, the wireless communication unit 240 transmits voice data to a server under the control of the control unit 290. The server recognizes context by analyzing voice data and transmits the recognized context information to the portable processing device 200.

The control unit 290 executes a collaboration program and performs a function of a server or a client. Embodiments related to a function of the control unit 290 are described hereinafter with reference to drawings.

Portable processing device 200 may include one or more other elements such as a GPS module, a vibration motor, a near field communication (NFC) module, and the like. Additionally, some of the above-mentioned elements in the portable processing device 200 may be omitted or replaced with another.

Figure 3:
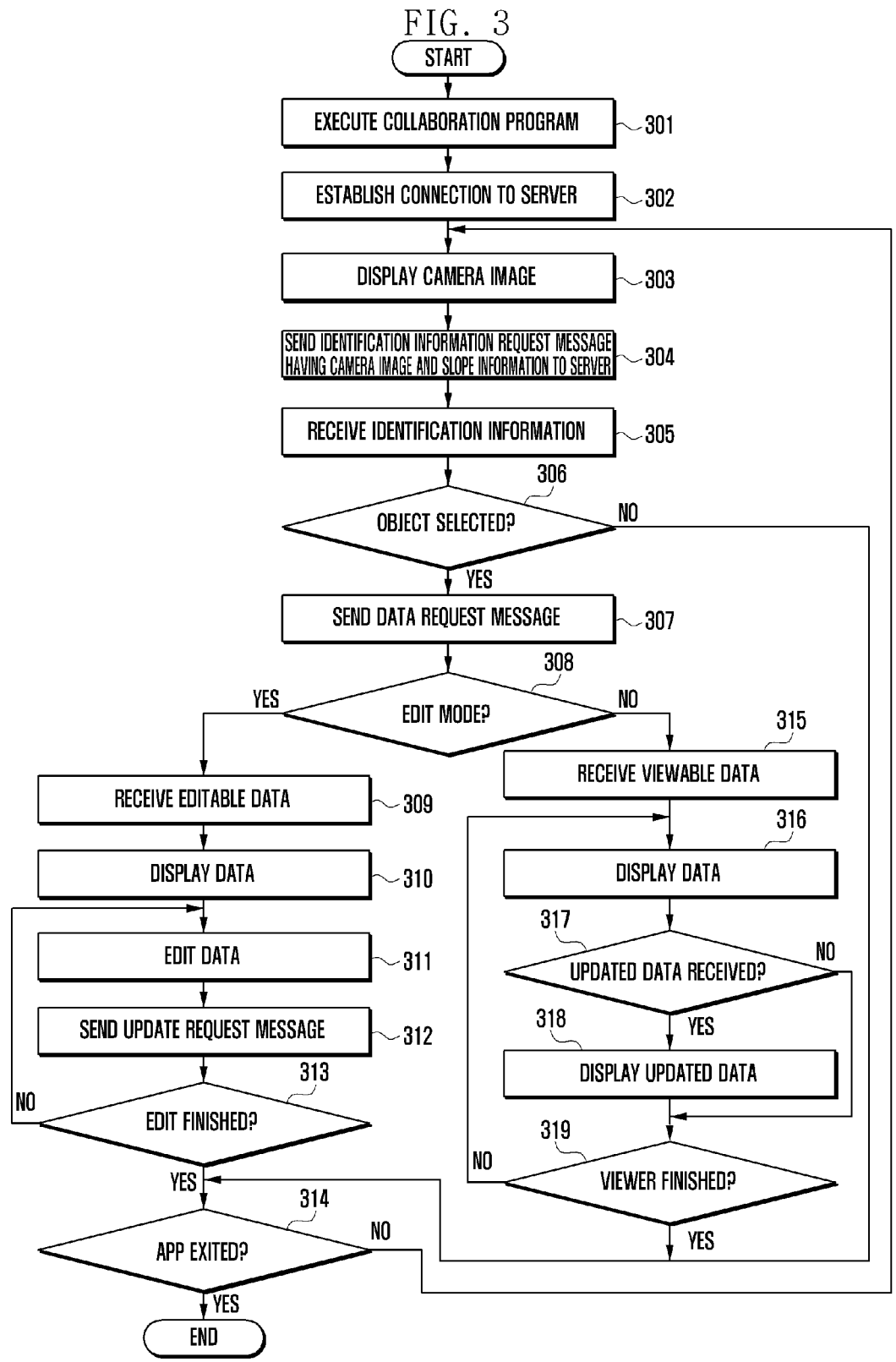
FIG. 3 is a flow diagram illustrating a collaborative method of a client in accordance with an embodiment of the present invention.
Figure 4:
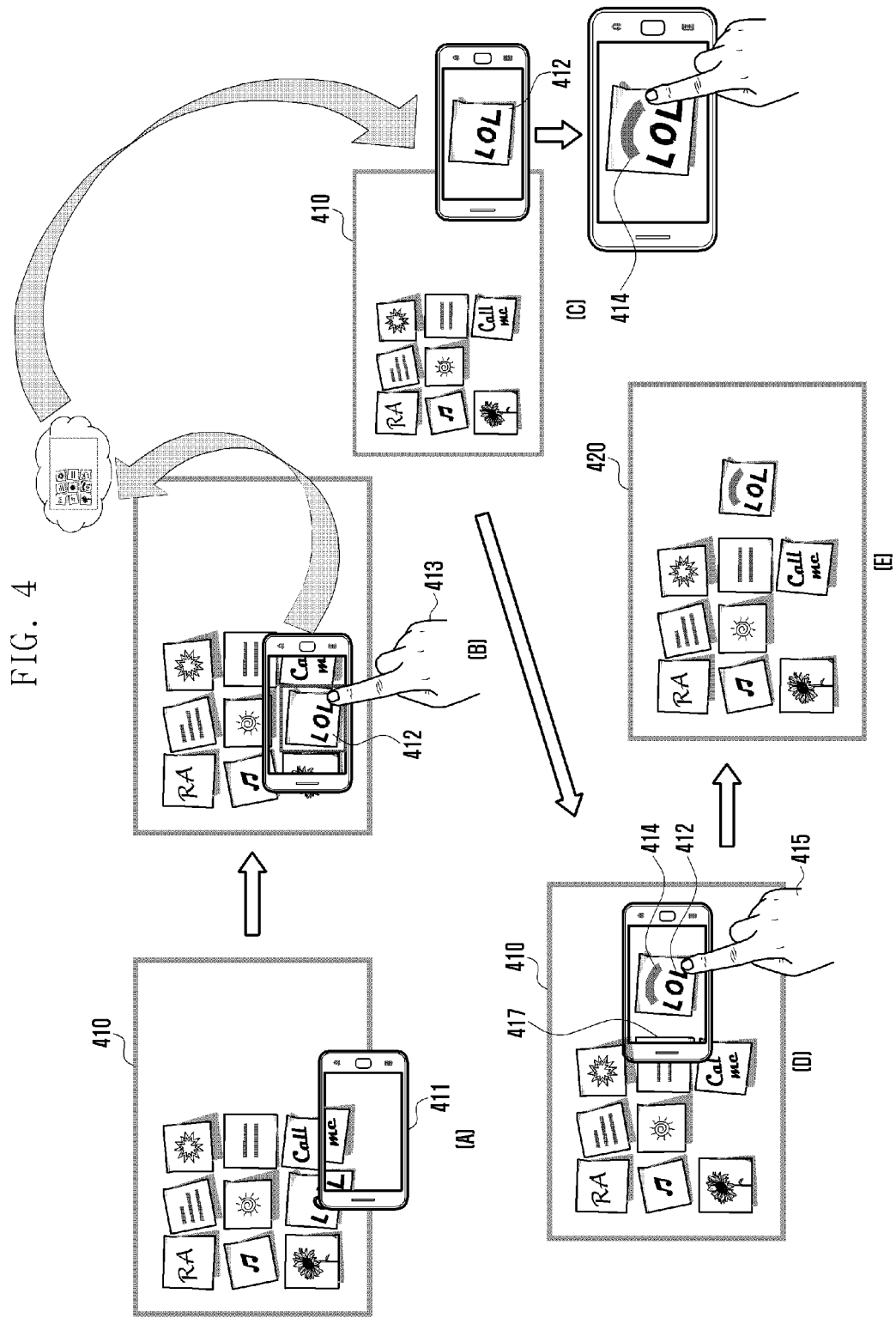
FIG. 4 is a schematic diagram illustrating a collaborative method of a client in accordance with an embodiment of the present invention.

FIG. 3 is a flow diagram illustrating a collaboration method of a client in accordance with an embodiment of the present invention. The description of FIG. 3 will be based on the assumption that the portable processing device 200 is a client. FIG. 4 is a schematic diagram illustrating a collaborative method of a client in accordance with an embodiment of the present invention.

Referring to FIG. 3, the display unit 210 may display a home screen under the control of the control unit 290. The control unit 290 may detect an event (e.g., to tap a relevant icon on the home screen) for requesting the execution of a collaboration program from the touch screen 211. Also, the control unit 290 may execute a collaboration program by recognizing a user voice or user motion. At activity 301, the control unit 290 executes a collaboration program in response to a request event. Specifically, at activity 301, the control unit 290 loads a collaboration program in the main memory unit, executes the program and controls the display unit 210 to display an execution screen of the collaboration program.

At activity 302, the control unit 290 establishes a connection to an external entity, i.e., a server. This establishing process may include a request process in which the portable processing device 200 transmits to the server a request message for requesting a registration as a client, and a response process in which the server transmits to the portable processing device 200 a response message for indicating whether a registration is approved or not.

If a connection is established (e.g., if the control unit 290 receives a response message, indicating a registration as a client, from the server through the wireless communication unit 240), at activity 303, the control unit 290 drives the camera 270, receives an image from the camera 270, and controls the display unit 210 to display the received camera image (e.g., a part 411 of a virtual collaboration window 410 shown in stage (A) of FIG. 4).

At activity 304, the control unit 290 selects a camera image displayed on the display unit 210 from among camera images received from the camera 270, and controls the wireless communication unit 240 to transmit, to the server, an identification information request message containing the selected camera image. Also, at activity 304, the control unit 290 may calculate the orientation of the portable processing device 200 and controls the wireless communication unit 240 to transmit information about the calculated orientation to the server. The identification information request message may have a camera image and orientation information. If the acceleration of gravity received from the sensor unit 260 has at least one axis ingredient, the control unit 290 calculates the orientation of the portable processing device 200 by using an acceleration value with regard to each axis. The calculated orientation may include a roll angle ($\varphi$), a pitch angle ($\theta$), and a yaw angle ($\psi$). A roll angle ($\varphi$) refers to a rotation angle on the X-axis, a pitch angle ($\theta$) refers to a rotation angle on the Y-axis, and a yaw angle ($\psi$) refers to a rotation angle on the Z-axis. If the acceleration of gravity received from the sensor unit 260 has X-axis and Y-axis ingredients of 0 m/sec$^2$ and Y-axis ingredient of 9.8 m/sec$^2$, the orientation ($\varphi$, $\theta$, $\psi$) of the portable processing device 200 is (0, 0, 0). In this way, an orientation of the portable processing device 200 is calculated. Using known algorithms such as a position calculation algorithm using either Eulerian angles or extended Kalman filter or an acceleration estimation switching algorithm, the control unit 290 may calculate the orientation of the portable processing device 200. Various different methods may be used for measuring the orientation of the portable processing device 200 according to embodiments.

The server receives the identification information request message from the portable processing device 200, recognizes which part of the virtual collaboration window is a camera image, and determines whether an object (e.g., a Post-it note 412 shown in stage (B) of FIG. 4) is contained in the recognized part. If an object is contained, the server transmits to the portable processing device 200 a response message containing identification information related to the object.

At activity 305, the control unit 290 receives the response message from the server through the wireless communication unit 240, and controls the display unit 210 to display the identification information contained in the response message on a corresponding object. This identification information may be augmented reality (AR) information overlapped on the object. To display the identification information may be omitted from activity 305.

At activity 306, the control unit 290 may detect a selection of an object (e.g., via user tap action 413 on the Post-it note 412) on the displayed camera image. This selection of an object may be made by means of user voice or motion.

When the object is selected by a user, at activity 307, the control unit 290 controls the wireless communication unit 240 to transmit to the server a message for requesting data corresponding to the identification information of the selected object. If no object is selected, the process proceeds with activity 314 to be discussed later.

At activity 308, the control unit 290 determines whether the requested data is editable. For example, the control unit 290 may receive information about whether the requested data is editable, from the server through the wireless communication unit 240.

In response to determination of an edit mode that allows data to be edited at activity 308, the control unit 290 receives at activity 309 editable data from the server through the wireless communication unit 240. At activity 310, the control unit 290 controls the display unit 210 to display the received data. For example, as shown in stage (C) of FIG. 4, the display unit 210 displays the Post-it note 412 under the control of the control unit 290. At this time, the server may remove the Post-it note 412 from the virtual collaboration window 410. Additionally, at activity 310, by controlling the display unit 210 or the audio processing unit 250, the control unit 290 may inform a user that data is editable. At activity 311, the control unit 290 edits data in response to user input from the touch screen 211 or the key input unit 220. For example, as shown in stage (C) of FIG. 4, the control unit 290 detects a movement or touch from the touch screen 211 and controls the display unit 210 to display a memo 414 (i.e., a path of touch) corresponding to the touch movement. At activity 312, the control unit 290 controls the wireless communication unit 240 to transmit an updated request message containing the edited data to the server. At this time, the updated request message may have location information of the edited data. For example, if a user makes a tap action 415 on the edited data, i.e., the Post-it note 412 with the memo 414 as shown in stage (D) of FIG. 4, the control unit 290 controls the wireless communication unit 240 to transmit to the server an updated request message containing the Post-it note 412 with the memo 414 and a camera image 417 (i.e., location information) captured at the time point of the tap action 415. Referring to stage (D) of FIG. 4, the camera image 417 may be displayed as background, and the Post-it note 412 may be displayed as foreground. The server receives the update request message from the portable processing device 200 and thereby updates a virtual collaboration space and a virtual collaboration window. Specifically, referring to stage (D) of FIG. 4, the server recognizes which part of the virtual collaboration window 410 corresponds to the camera image 417. Referring to stage (E) of FIG. 4, the server controls the projector to display the Post-it note 412 with the memo 414 at the recognized part. Additionally, the server updates the existing Post-it note 412 to the Post-it note 412 with the memo 414 and also updates the existing virtual collaboration window 410 to a new virtual collaboration window 420.

At activity 313, the control unit 290 determines whether to finish an edit mode. For example, if an edit save button is tapped on the display unit 210, the control unit 290 finishes an edit mode and proceeds with activity 314. Additionally, in response to editing being finished, the control unit 290 controls the wireless communication unit 240 to transmit, to the server, information indicating that editing is finished. If an edit mode is not finished, the process returns to activity 311.

At activity 314, the control unit 290 determines whether to exit a running application. For example, if an application exit button is tapped on the display unit 210, the control unit 290 terminates the execution of application. Otherwise, the process returns to activity 303.

In response to a determination of a viewer mode that disallows editing and only allows viewing at activity 308, the control unit 290 receives at activity 315 viewable data from the server through the wireless communication unit 240. At activity 316, the control unit 290 controls the display unit 210 to display the received viewable data. At activity 317, the control unit 290 determines whether update information is received. If received, at activity 318 the control unit 290 controls the display unit 210 to display the updated data. If not received, the process proceeds with activity 319.

At activity 319, the control unit 290 determines whether to finish a viewer mode. For example, if a viewer close button is tapped on the display unit 210, the control unit 290 finishes a viewer mode and proceeds with activity 314. Additionally, when a viewer mode is finished, the control unit 290 controls the wireless communication unit 240 to transmit, to the server, information indicating that a viewer is finished. If a viewer mode is not finished, the process returns to activity 316.

FIGS. 5 to 9 show collaboration methods performed at a server in accordance with an embodiment of the present invention.

Figure 5:
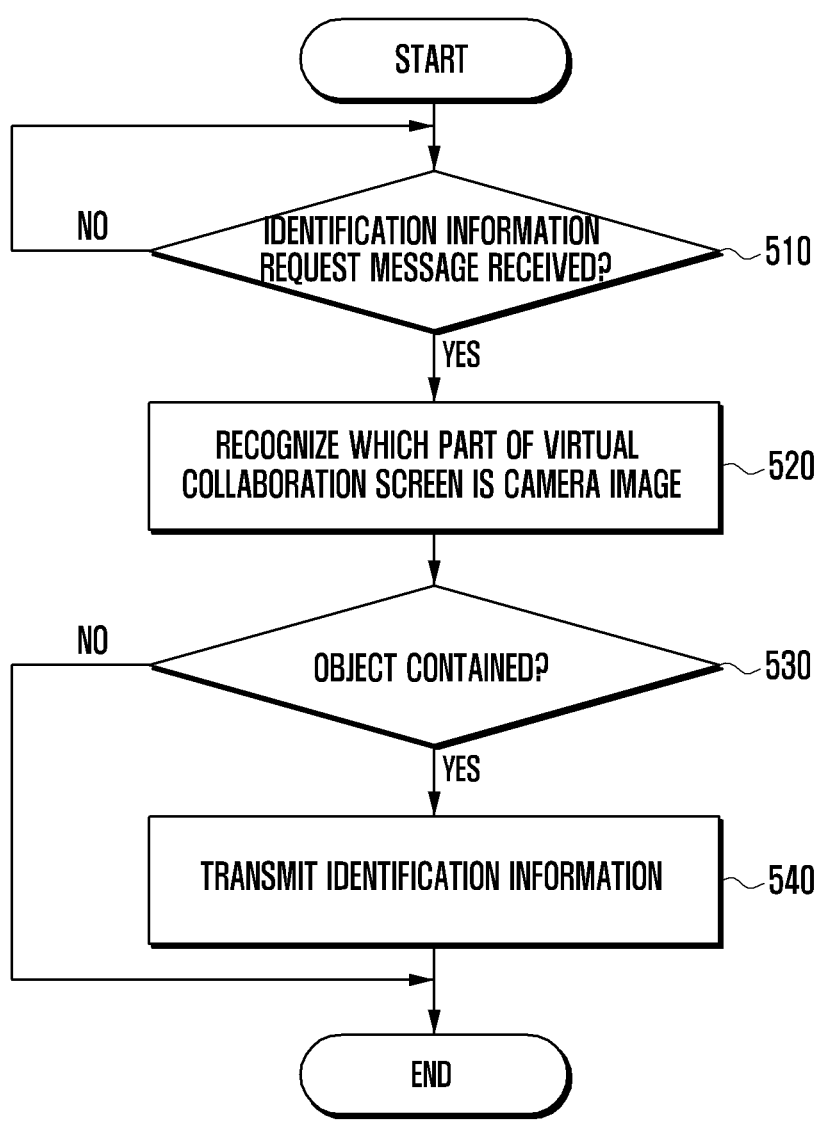
FIG. 5 is a flow diagram illustrating a method for processing an identification information request message of a client at a server in accordance with an embodiment of the present invention.

FIG. 5 is a flow diagram illustrating a method for processing an identification information request message of a client at a server in accordance with an embodiment of the present invention. The description of FIG. 5 is based on the assumption that the portable processing device 200 is a server.

Referring to FIG. 5, at activity 510, the control unit 290 determines whether an identification information request message is received from any external entity, i.e., a client. This identification information contains a camera image and may further contain orientation information.

If the identification information request message is received from the client, the control unit 290 recognizes at activity 520 which part of a virtual collaboration window is a camera image. When a user portable processing device (i.e., a client) captures a virtual collaboration window, the axis of a lens of the camera is often oriented at an angle to the virtual collaboration window rather than being at a right angle. Therefore, a camera image is captured at an angle different from a real image so recognition performed at activity 520 may have an error. So, if orientation information is received together with the camera image from the client, the control unit 290 corrects at activity 520 the camera image in response to the received orientation information. This is described later with reference to FIG. 6.

At activity 530, the control unit 290 determines whether the recognized part includes an object.

If an objected is included, the control unit 290 controls at activity 540 the wireless communication unit 240 to transmit to the client a response message containing identification information related to the object.

FIG. 6 is a flow diagram illustrating a method for correcting a camera image in accordance with an embodiment of the present invention.

Referring to FIG. 6, at activity 610, the control unit 290 of the portable processing device 200 (i.e., a server) receives an identification information request message containing a camera image 601 and orientation information from a client through the wireless communication unit 240.

At activity 620, the control unit 290 corrects the camera image 601 by transformation (scaling, rotation and translation) operations to an original image 602 in response to the orientation information.

At activity 630, the control unit 290 recognizes which part of a virtual collaboration window 603 corresponds to the original image 602 by feature matching.

At activity 640, the control unit 290 recognizes an object contained in the original image 602 by object shape and attribute (color, shading, text) matching.

At activity 650, the control unit 290 reads identification information (e.g., AR information 604) corresponding to the recognized object from the memory unit 230 and controls the wireless communication unit 240 to transmit the read AR information 604 to the client.

Figure 7:
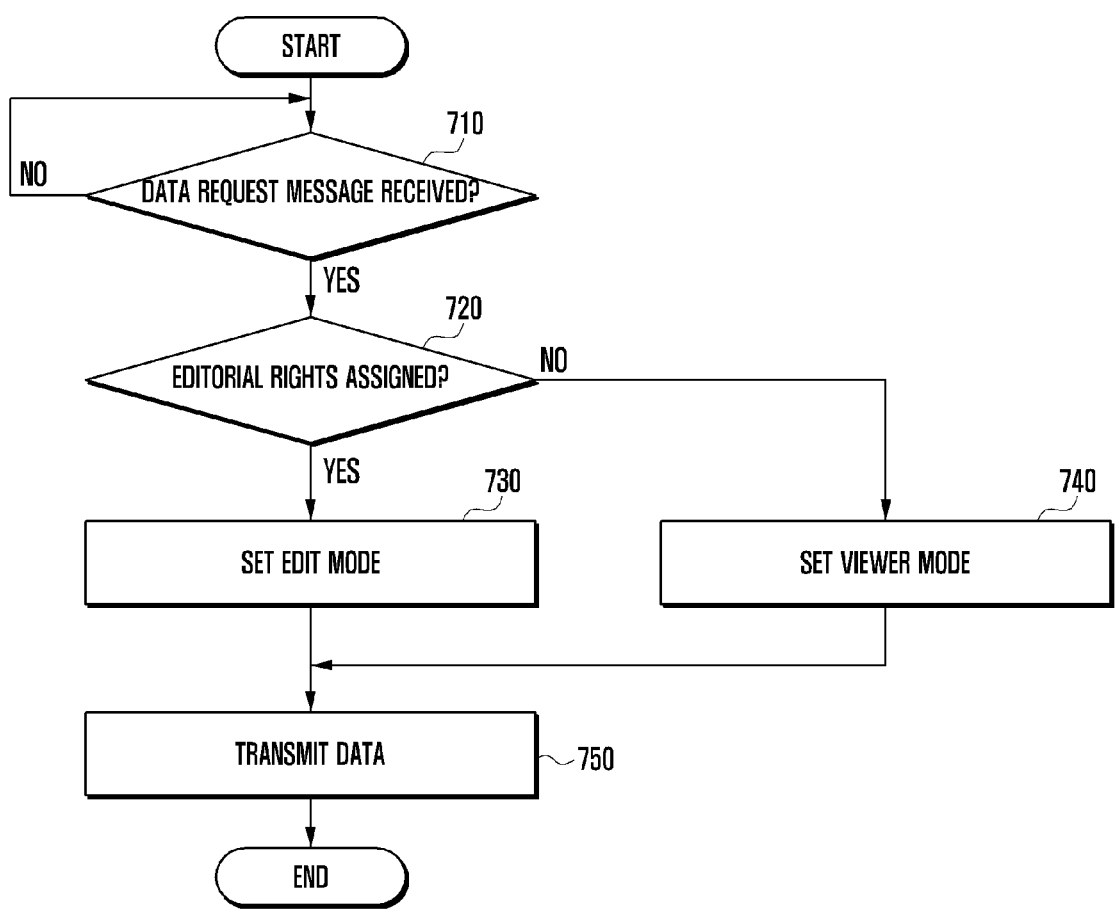
FIG. 7 is a flow diagram illustrating a method for processing a data request message of a client at a server in accordance with an embodiment of the present invention.

FIG. 7 is a flow diagram illustrating a method for processing a data request message of a client at a server in accordance with an embodiment of the present invention. The description of FIG. 7 is based on the assumption that the portable processing device 200 is a server.

Referring to FIG. 7, at activity 710, the control unit 290 determines whether a data request message is received from any external entity (i.e., a client) through the wireless communication unit 240. This data request message contains identification information.

If the data request message is received from the client, the control unit 290 determines at activity 720 whether to assign editorial rights to the client. For example, the control unit 290 manages an editorial rights assignment list stored in the memory unit 230 as shown in Table 1.

TABLE 1

|  |  | 1st Client | 2nd Client | 3rd Client |
|---|---|---|---|---|
|  | 1st Data | ○ |  |  |
|  | 2nd Data |  | ○ |  |
|  | 3rd Data |  |  |  |
| 4th Data | 1st Stereoscopic Image |  | ○ |  |
|  | 2nd Stereoscopic Image |  |  |  |

Referring to Table 1, if the data request message is received from the third client and if data corresponding to identification information in the received data request message is the third data, no one is now editing the third data. Therefore, at activity 730, the control unit 290 sets an edit mode for the third client. At activity 730, the control unit 290 controls the wireless communication unit 240 to transmit information indicating edit approval to the third client. Additionally, the control unit 290 updates the editorial rights assignment list shown in Table 1 to indicate that the editorial rights of the third data is assigned to the third client.

If the third client requests the first data, the control unit 290 sets at activity 740 a viewer mode for the third client since the first data is already being edited by the first client. At activity 740, the control unit 290 controls the wireless communication unit 240 to transmit, to the third client, information indicating edit disapproval and viewer approval.

At activity 750, the control unit 290 controls the wireless communication unit 240 to transmit the third data. At this time, the third data may be transmitted together with information indicating edit approval or not. Namely, at activity 750 subsequent to activity 730, the control unit 290 may control the wireless communication unit 240 to transmit, to the third client, data together with information indicating edit approval. Similarly, at activity 750 subsequent to activity 740, the control unit 290 may control the wireless communication unit 240 to transmit, to the third client, data together with information indicating edit disapproval and viewer approval.

Data may be a stereoscopic image or a 3D image, especially, corresponding to orientation information and may be varied according to a viewpoint from which a user looks at the virtual collaboration window. Referring to Table 1, if the third client requests the fourth data from the server, the server determines, based on orientation information of the third client, which stereoscopic image of the fourth data is provided to the third client and also determines whether to assign the editorial rights to the third client. If the orientation information of the third client corresponds to the second stereoscopic image of the fourth data, the server transmits the second stereoscopic image to the third client and also assigns the editorial rights. If the orientation information of the third client corresponds to the first stereoscopic image of the fourth data, the server transmits the first stereoscopic image to the third client but does not assign the editorial rights. As discussed above, the client may receive data corresponding to orientation information from the server and edit the received data. This is described with reference to FIG. 8.

Figure 8:
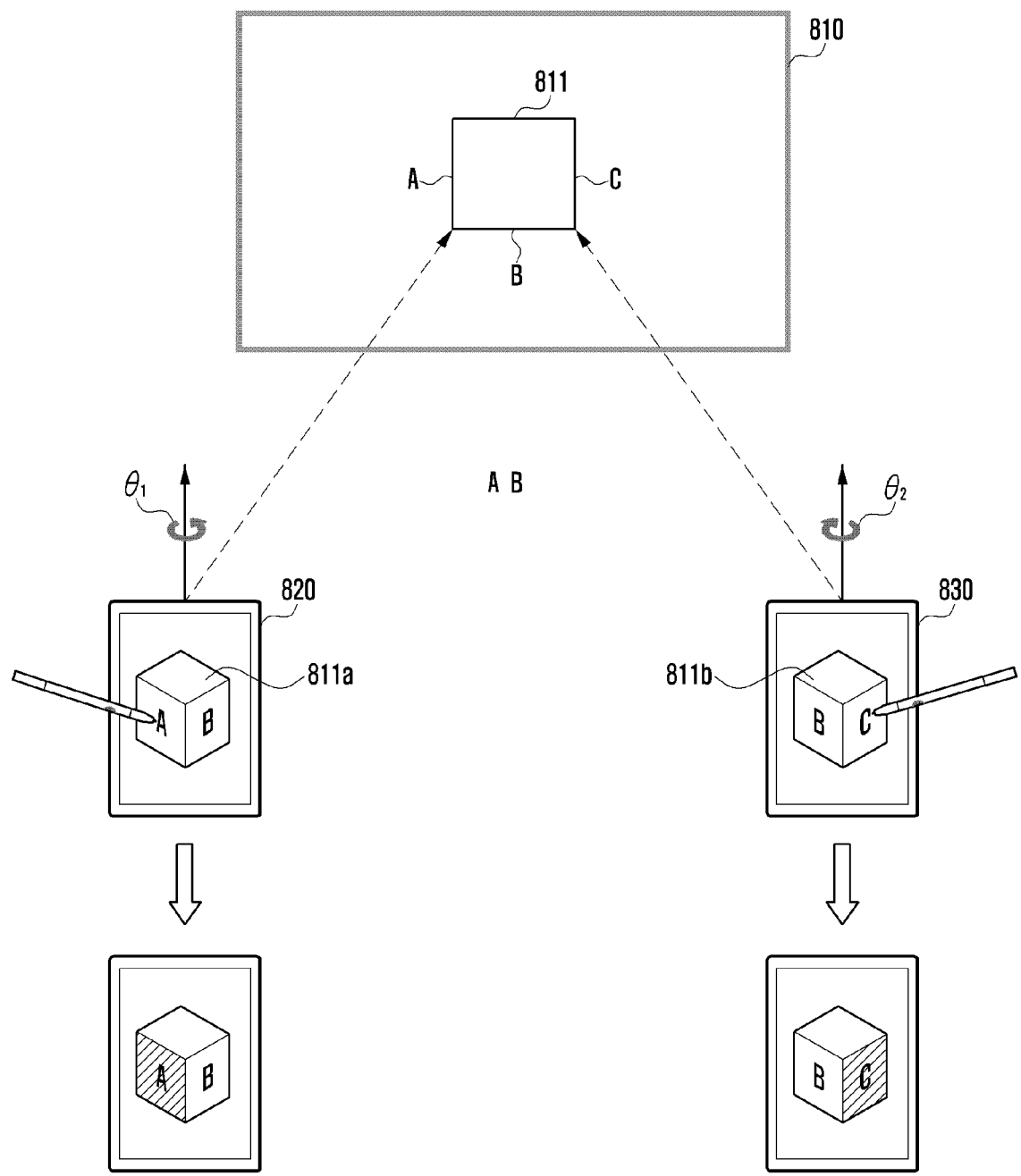
FIG. 8 is a flow diagram illustrating a method for editing data in accordance with an embodiment of the present invention.

FIG. 8 is a flow diagram illustrating a method for editing data in accordance with an embodiment of the present invention.

Referring to FIG. 8, the server displays a virtual collaboration window 810 having a quadrangle-shaped object 811. The server receives the first orientation information (e.g., $\theta_1$) of the first client 820 from the first client 820. Then the server selects the first stereoscopic image 811a corresponding to the first orientation information among stereoscopic images of the objects 811, and transmits the selected first stereoscopic image 811a to the first client 820. As shown, the first stereoscopic image 811a is an image having the planes A and B of the object 811. The server assigns the editorial rights for the planes A and B to the first client 820. Therefore, a user of the first client 820 can edit the object 811, e.g., change the color of the plane A with a pen. Changed color information of the plane A is transmitted to the server.

The server receives the second orientation information (e.g., $\theta_2$) of the second client 830 from the second client 830. Then the server selects the second stereoscopic image 811b corresponding to the second orientation information among stereoscopic images of the objects 811, and transmits the selected second stereoscopic image 811b to the second client 830. As shown, the second stereoscopic image 811b is an image having the planes B and C of the object 811. The server assigns the editorial rights for the plane C to the second client 830. Therefore, a user of the second client 830 can edit the object 811, e.g., change the color of the plane C with a pen. Changed color information of the plane C is transmitted to the server.

As discussed above, the client can display a stereoscopic image to correspond to user's view, and edit the same data jointly with other clients. The client may support a 3D display such as a hologram, a head mounted display, or a multiple viewpoint. Therefore, the client may display a 3D image as well as a stereoscopic image to correspond to user's view.

Figure 9:
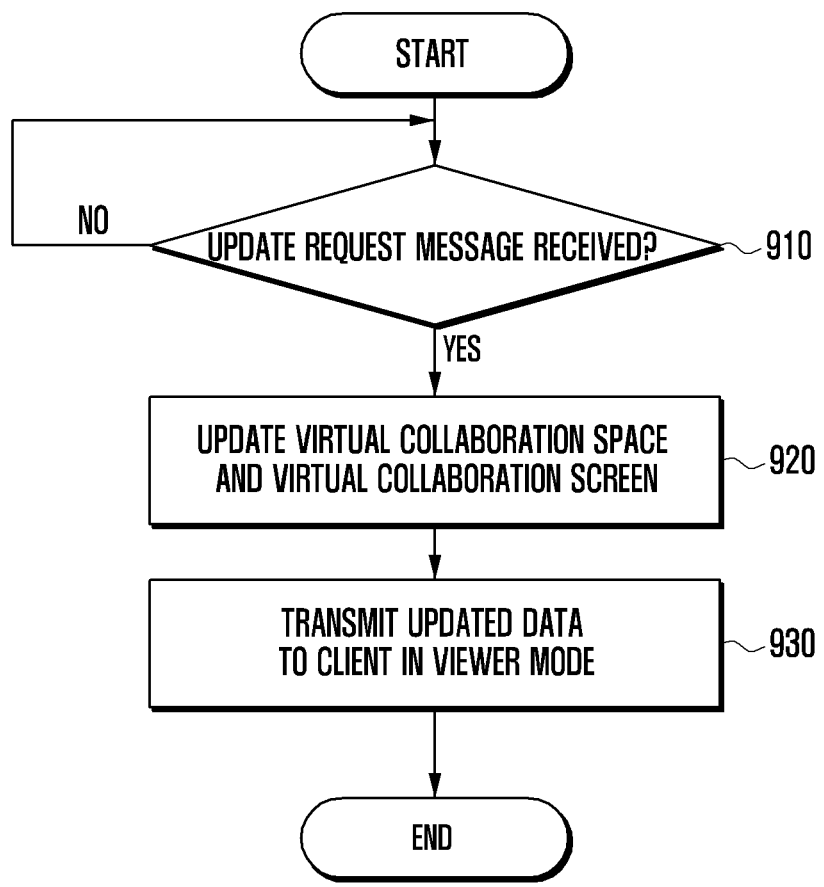
FIG. 9 is a flow diagram illustrating a method for processing an update request message of a client at a server in accordance with an embodiment of the present invention.

FIG. 9 is a flow diagram illustrating a method for processing an update request message of a client at a server in accordance with an embodiment of the present invention. The description of FIG. 9 is based on the assumption that the portable processing device 200 is a server.

Referring to FIG. 9, at activity 910, the control unit 290 determines whether an update request message is received from the client through the wireless communication unit 240. The update request message contains edited data.

If the update request message is received, the control unit 290 updates at activity 920 both a virtual collaboration space and a virtual collaboration window. Additionally, at activity 920, the control unit 290 may check, referring to an editorial rights assignment list as shown in Table 1, whether the client sending the update request message has the editorial rights for relevant data. If the client has the editorial rights, the control unit 290 updates both the virtual collaboration space and the virtual collaboration window. If the client has no editorial rights, the control unit 290 does not respond to the update request.

At activity 930, the control unit 290 controls the wireless communication unit 240 to transmit updated data to the client for which a viewer mode is set.

Figure 10:
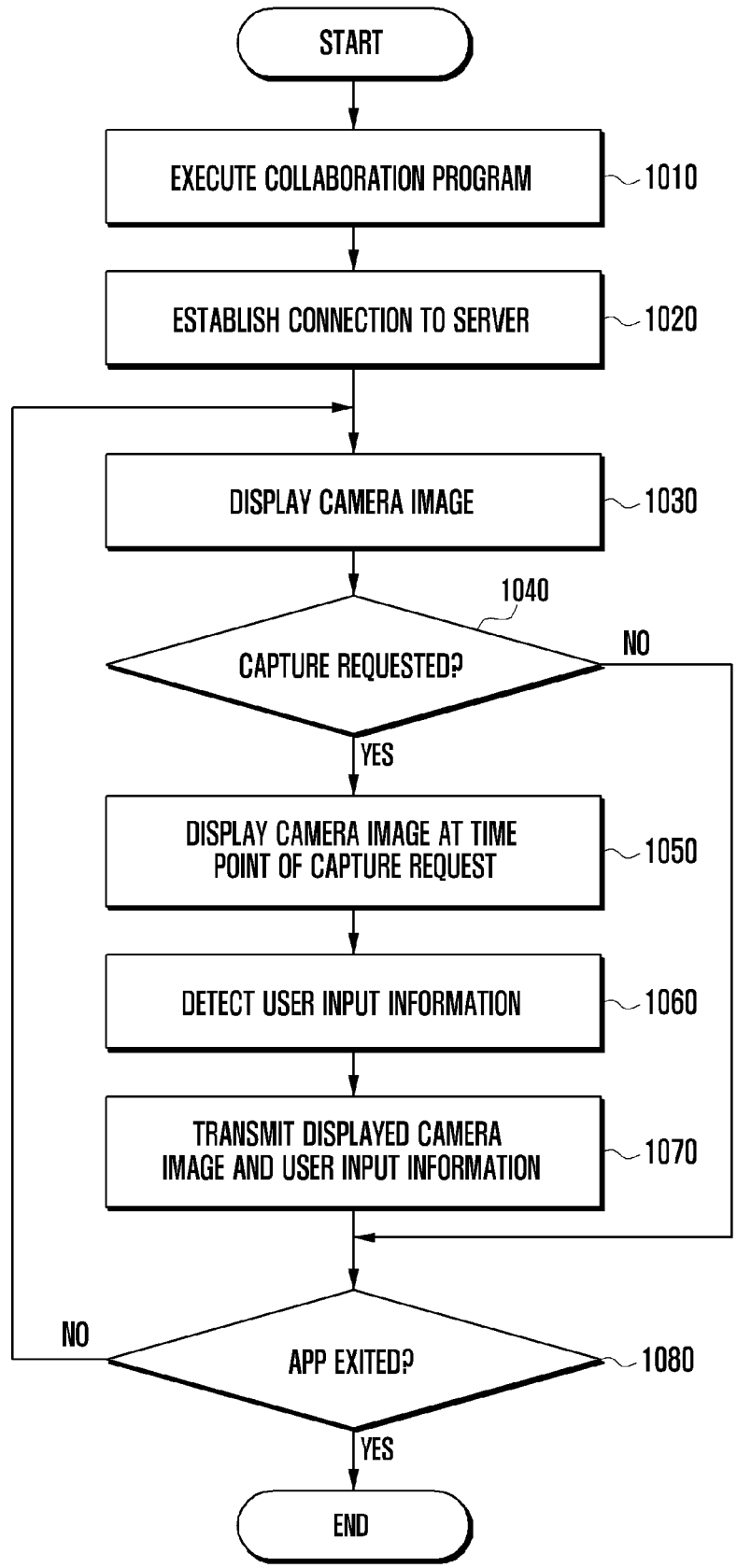
FIG. 10 is a flow diagram illustrating a collaborative method of a client in accordance with another embodiment of the present invention.

FIG. 10 is a flow diagram illustrating a collaboration method of a client in accordance with another embodiment of the present invention. The description of FIG. 10 is based on the assumption that the portable processing device 200 is a client.

Referring to FIG. 10, at activity 1010, the control unit 290 executes a collaboration program in response to a request event. Specifically, at activity 1010, the control unit 290 loads the collaboration program in the main memory unit and controls the display unit 210 to display an execution screen of the collaboration program.

At activity 1020, the control unit 290 establishes a connection to a server.

If a connection is established, at activity 1030 the control unit 290 drives the camera 270, receives an image from the camera 270, and controls the display unit 210 to display the received camera image.

At activity 1040, the control unit 290 may detect a capture request event from the touch screen 211 or the key input unit 220.

If a capture request event is detected, at activity 1050 the control unit 290 selects, from among camera images received from the camera 270, a specific camera image received at the time point when the capture request event is detected, and controls the display unit 210 to display the selected camera image. If no capture request event is detected, a process proceeds with activity 1080.

At activity 1060, the control unit 290 may detect user input information (e.g., a touch path, a letter input through a keypad displayed on the touch screen 211, for example) from the touch screen 211.

If user input information is detected, the control unit 290 controls at activity 1070 the wireless communication unit 240 to transmit the user input information together with the displayed camera image to the server.

At activity 1080, the control unit 290 determines whether to exit a running application. For example, if an application exit button is tapped on the display unit 210, the control unit 290 terminates the execution of application. Otherwise, a process returns to activity 1030.

Figure 11:
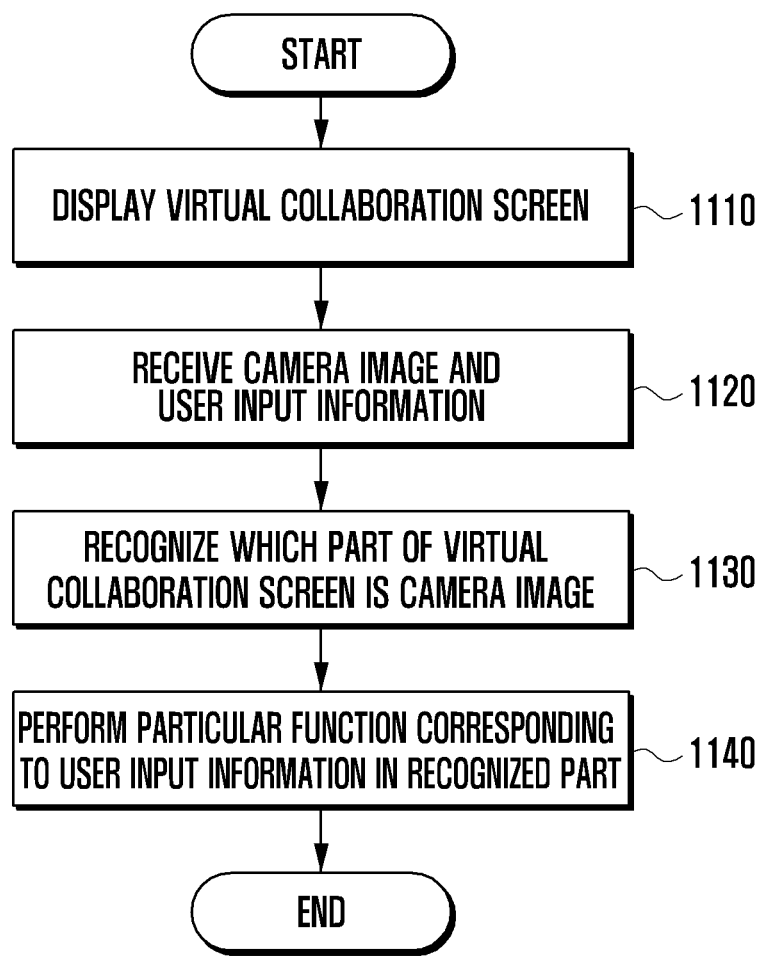
FIG. 11 is a flow diagram illustrating a collaborative method of a server in accordance with an embodiment of the present invention.

FIG. 11 is a flow diagram illustrating a collaboration method of a server in accordance with an embodiment of the present invention. The description of FIG. 11 is based on the assumption that the portable processing device 200 is a server.

Referring to FIG. 11, at activity 1110, the control unit 290 controls the projector, through the wireless communication unit 240, to display a virtual collaboration window on the screen. The virtual collaboration window may be also displayed on the display unit 210 of the portable processing device 200. For example, the virtual collaboration window (defined herein as a "document") may be a web page, a satellite photograph, a load view, a PowerPoint document, text spreadsheet or other content allowing user editing of the window format and content.

At activity 1120, the control unit 290 receives a camera image and user input information from the client through the wireless communication unit 240.

At activity 1130, the control unit 290 recognizes which part of the virtual collaboration window corresponds to the camera image.

At activity 1140, the control unit 290 performs a particular function corresponding to the user input information in the recognized part. For example, the control unit 290 controls the projector through the wireless communication unit 240 to display a memo corresponding to a touch path in the recognized part. The user input information entered in the portable processing device 200 may be displayed on the virtual collaboration window.

The above-discussed collaboration method of present invention is described herein with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational activities to be performed on the computer or other programmable apparatus to produce a computer implemented process such that the instructions that are executed on the computer or other programmable apparatus provide activities for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

While this invention has been particularly shown and described with reference to an exemplary embodiment thereof, it will be understood by those skilled in the art that various changes in form and details may be made therein without departing from the spirit and scope of the invention as defined by the appended claims. No claim element herein is to be construed under the provisions of 35 U.S.C. 112, sixth paragraph, unless the element is expressly recited using the phrase "means for". The term "virtual" as used herein means not physically existing but made by software and stored in electronic memory and appearing to physically exist.

What is claimed is:

1. A collaborative content editing method implemented by a mobile processing device having a camera, the method comprising:
    establishing communications between the mobile processing device and a server hosting a virtual collaboration window projected onto an external surface;
    acquiring, by the camera, and in response to a first user input, a first image, the first image including at least one object of a plurality of objects arranged in the virtual collaboration window, the at least one object having a first relative position to the plurality of other objects;
    after acquiring the first image:
        sending a signal, by the mobile processing device, causing removal of the at least one object from the virtual collaboration window and displaying the at least one object on a touch screen display of the mobile processing device; and
        receiving a second user input to edit at least one object in the first image, wherein receiving the second user input to edit the at least one object comprises:
            receiving a handwriting gesture on the mobile processing device directly over the at least one object; and
            causing the at least one object to be updated with the handwriting gesture, wherein the handwriting gesture is converted to a handwriting image and is co-displayed with the at least one object;
    detecting movement of the camera, from a first point to a second point within the virtual collaboration window, such that a view point of the camera changes from the first relative position to the plurality of other objects to a second relative position to the plurality of other objects;
    responsive to detecting movement of the camera and receiving a third user input, removing the edited at least one object from the touch screen display of the mobile processing device and displaying the edited at least one object at the second relative position to the plurality of other objects in the virtual collaboration window; and
    transmitting the edited at least one object to the server enabling the server to update the plurality of other objects with the edited at least one object, and to position the edited at least one object at the second relative position to the plurality of other objects in the virtual collaboration window.

2. The method of claim 1, wherein editing the at least one object is performed in response to editorial rights being assigned by the server.

3. The method of claim 1, wherein the second user input and editing of the at least one object occur while detecting the movement.

4. A portable processing device comprising:
    a camera;
    a wireless communication unit configured to perform wireless communication with a server;
    a display unit having a touch screen and configured to display an image acquired by the camera and to display data received from the server through the wireless communication unit, the image corresponds to part of a collaboration window generated by the server; and
    a control unit configured to control the camera, the wireless communication unit and the display unit,
    wherein the control unit is configured to:
        cause the wireless communication unit to establish communications between the portable processing device and a server hosting a virtual collaboration window;
        acquire, from the camera, and in response to a first user input, a first image, the first image including at least one object of a plurality of objects arranged in the virtual collaboration window, the at least one object having a first relative position to the plurality of other objects;
        after acquiring the first image:
            removing the at least one object from the virtual collaboration window and displaying the at least one object on a touch screen display of the portable processing device; and
            receiving second a user input to edit at least one object in the first image, wherein receiving the second user input to edit the at least one object further comprises:
                receiving a handwriting gesture on the portable processing device directly over the at least one object; and
                causing the at least one object to be updated with the handwriting gesture, wherein the handwriting gesture is converted to a handwriting image and is co-displayed on the at least one object;
detect movement of the camera, from a first point to second point within the virtual collaboration window, such that a view point of the camera changes from the first relative position to the plurality of other objects to a second relative position to the plurality of other objects;
responsive to detecting movement of the camera and receiving a third user input, removing the edited at least one object from the touch screen display of the portable processing device and causing the display unit to display the edited at least one object at the second relative position to the plurality of other objects in the virtual collaboration window; and
cause the wireless communication unit to transmit the edited at least one object to the server enabling the server to update the plurality of other objects with the edited at least one object at the second relative position to the plurality of other objects in the virtual collaboration window.

5. The portable processing device of claim 4, further comprising:
a sensor unit configured to detect a physical parameter and to output detection information corresponding to the detected physical parameter,
wherein the control unit is further configured to calculate movement information by using the detection information and to control the wireless communication unit to transmit the movement information to the server such that the server corrects the first image in response to the movement information.

* * * * *